UNITED STATES PATENT OFFICE.

HAYDN M. BAKER, OF HARLEM, NEW YORK.

IMPROVED PROCESS OF REFINING CAST-IRON.

Specification forming part of Letters Patent No. 82,194, dated September 15, 1868.

*To all whom it may concern:*

Be it known that I, HAYDN M. BAKER, of Harlem, in the city, county, and State of New York, have invented a new and useful Process for Refining Cast and Pig Iron, which I verily believe has not before been known or used; and that the following is a full and exact description thereof.

The nature of my invention consists in the employment of soluble or insoluble silicates of soda or potash in intimate contact with iron, (while the said iron is at a very elevated temperature,) for the purpose of removing the sulphur and carbon, and also the oxides of iron and manganese, or any other metallic oxides with which the iron under treatment may be contaminated.

For the purposes of economy I prefer to use a soluble silicate, as that may be recovered and used repeatedly by making same into a solution, which will leave as a precipitate the insoluble sulphur and carbon with metallic oxides, while the clear solution of the silicate may be evaporated to dryness, and is ready for use again. One may, however, make use of insoluble silicates, as broken window-glass; but this admits of its use but once.

Iron-manufacturers make use of lime and other fluxes; but this does not remove the metallic oxides, or the sulphur and carbon; neither will pure silica do so; but a combination of silicic acid (silica) and the bases, as those of lime, soda, and potash, or magnesia, strontian, and baryta, will remove sulphur, carbon, and metallic oxides, and also silica itself, provided the silica employed in the purifying agent does not exist in too great an abundance. Of all the silicates I prefer the silicate of soda, as that makes or forms a silicate possessing mobile and tenacious properties to a greater degree than all others at high temperatures.

Mixtures of silicates may be used, as silicate of soda, or silicate of lead, or any broken glass consisting of said silicates, and, as this mixture is of much greater specific gravity than silicate of soda alone, it becomes very useful in refining iron to procure a very nice quality, when the said quality is more to be desired than the expense lamented. I do not, however, consider the use of the silicates of lead, or mixtures of same, as practicable.

To enable others to use the invention, I will proceed to describe it.

For foundry purposes, I refine the iron in the ladle as it comes from the cupola. I place twenty-five, or more or less, per cent. of the weight of iron the ladle is capable of holding of the silicate into the said ladle, and tap or draw the iron into it, and at the same time stir and agitate the iron and silicate together, with an iron instrument adapted to the purpose, until the iron has a clear appearance, like melted copper. I then skim off the silicate with a "skimmer," and immerse it in water. The iron in the ladle is ready for casting, and may be put into any kind of ware, or cast in pigs, as desired.

The silicate (if that employed were soluble) may be dissolved in water. The carbon, sulphur, and metallic oxides will remain undissolved.

The clear solution of silicate of soda or potash may be evaporated to dryness, and is ready for use in refining new quantities of iron.

With iron-smelters, I use a reverberatory furnace, and when the iron has become melted, and at a quite high temperature, I throw in the requisite quantity of silicate of soda or potash, and "puddle" them together for a sufficient length of time to have the silicate pick up or combine with the carbon, sulphur, and metallic oxides; then let the whole repose long enough to permit the silicate to rise to the surface, and then skim the same off, and treat said silicate as desired for foundry uses.

Silica or silicates cannot combine with metals, even at high temperatures, but will do so rapidly with oxides of metals. I wish here to except sulphur, with which silicates do combine. The iron may now be run off into pigs, or other forms suited to the demands of the market.

If the above process is continued about one-half the length of time employed in manufacturing wrought-iron by the present mode, a good quality of wrought-iron will be the result.

It is the fused silicates which come with crude pig-iron and iron ore that act as reducing agents in the present methods of manufacturing wrought-iron. Although the oxides of carbon are formed to some extent by the oxygen of the air passing through the furnace, still an analysis will show the greatest per cent. of the carbon was removed by the "slag" or "scoria," which is silicates of lime, magnesia, manganese, &c.

The advantages of this invention are, that it provides an economical method for procuring a nice quality of iron for gun-metal, engine-cylinders, and other purposes.

What I claim as my invention, and desire to secure by Letters Patent, is—

The use of soluble and fusible insoluble silicates of soda, potash, and other bases, consisting of silicate of lime, magnesia, barytes, strontian, lead, and bismuth, or mixtures of same, for the purpose of removing silica, sulphur, carbon, and metallic oxides from iron at very elevated temperatures, in the manner herein described, and for the purposes fully set forth.

HAYDN M. BAKER.

Witnesses:
  WM. ALEXANDER,
  R. H. MARSH.